R. ZAHN.
MOTION TRANSMITTING MECHANISM.
APPLICATION FILED MAR. 18, 1910.
961,830.
Patented June 21, 1910.
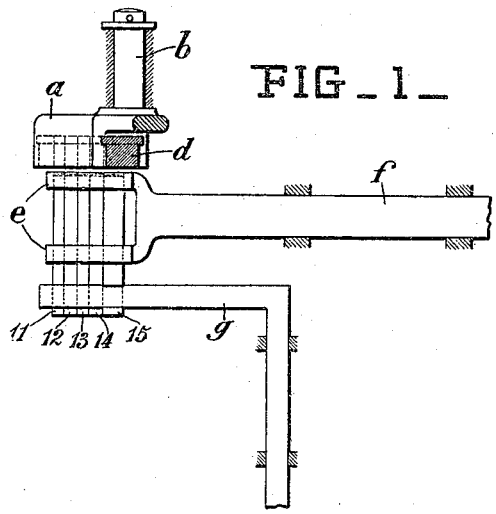
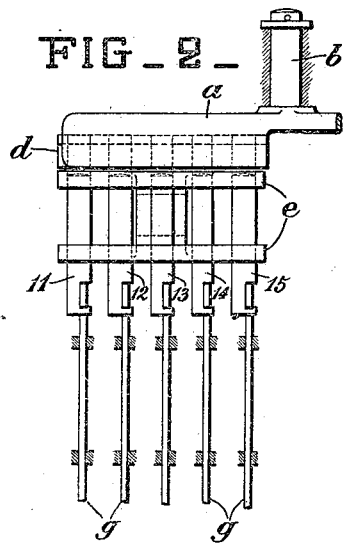
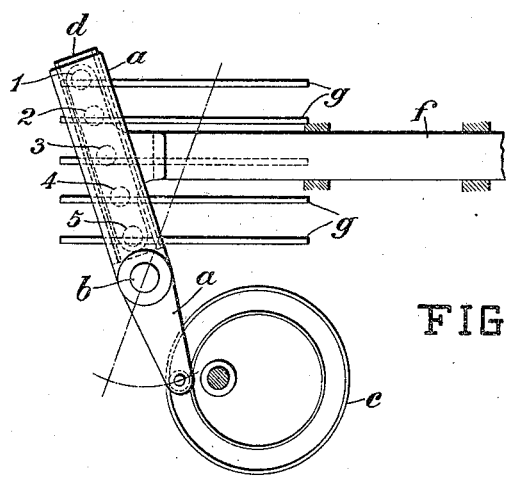
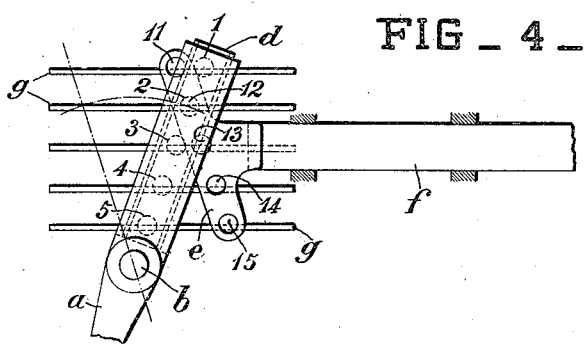

UNITED STATES PATENT OFFICE.

ROBERT ZAHN, OF PLAUEN, GERMANY.

MOTION-TRANSMITTING MECHANISM.

961,830.

Specification of Letters Patent. Patented June 21, 1910.

Application filed March 18, 1910. Serial No. 550,182.

*To all whom it may concern:*

Be it known that I, ROBERT ZAHN, a subject of the King of Bavaria, and resident of Plauen, Germany, have invented new and useful Improvements in Motion-Transmitting Mechanisms, of which the following is a full, clear, and exact specification.

The present invention relates to a mechanism for transmitting the motion of a graduated lever to a rectilinearly guided slide. By the term "graduated lever" a lever is to be understood which permits of variable amplitudes of motion being transmitted to the slide to be driven by the connection of the latter to different points of the lever. The present invention is characterized by the feature that for the determination of the various lengths of the lever, holes are provided in a sliding piece on said lever, whereby these holes are arranged at graduated distances from the pivoting point of the lever and the sliding piece is radially movable relatively to said pivoting point. A corresponding number of coupling bolts arranged in a head piece of the said reciprocating slide are provided for the purpose of connecting the graduated lever with the slide to be driven. These coupling bolts lie opposite to the corresponding holes in the sliding piece in one position of the graduated lever. This is the coupling position. Any one of the bolts, according to choice, can then be thrust into the corresponding hole so as to effect the coupling of the graduated lever and the reciprocating slide according to one or other of the graduated lengths of the lever.

The accompanying drawing shows one form of carrying out the present invention in which—

Figure 1 is a vertical section. Fig. 2 is a side view. Fig. 3 is a plan view of the lever mechanism, and Fig. 4 is a further plan view of the mechanism but showing a different relative position of the graduated lever and the reciprocating slide.

*a* is the graduated lever movable about a pivot *b* and which is driven by an eccentrically slotted disk *c*. A piece *d* is arranged to slide radially in the graduated lever relative to the pivot *b*, and is provided with a row of holes 1, 2, 3, 4, 5 at varying distances from the pivoting point of the lever. These holes correspond to a like number of coupling bolts 11, 12, 13, 14, 15, which are arranged in a head piece *e* of a rectilinearly guided reciprocating slide *f*, and are controlled by angle bars *g*.

If the coupling bolts 11, 12, 13, 14, 15 are in the lower position as shown in Figs. 1 and 2, then the graduated lever *a* swings freely to and fro under the action of the eccentrically slotted disk *c* without communicating its motion to the slide *f*. The connection of the graduated lever *a* with the slide *f* is effected when the parts are in the position shown in Fig. 3, in which the holes 1, 2, 3, 4, 5 of the sliding piece *d* lie exactly opposite the corresponding bolts 11, 12, 13, 14, 15, so that when either of the latter, take for instance the coupling bolt 12, is raised by means of its respective angle bar *g*, it enters the corresponding hole 2 of the sliding piece *d* and the coupling of the graduated lever with the reciprocating slide is thereby effected at the hole corresponding to the length of lever arm chosen. When the graduated lever swings (Fig. 4), it then imparts an amplitude of motion to the reciprocating slide *f* corresponding to the length of lever arm chosen, whereby as the coupling bolt 12 moves rectilinearly together with the reciprocating slide *f*, the sliding piece *d* will slide on the graduated lever relative to the pivoting point of this lever. In this arrangement, an unconstrained relative movement between the graduated lever and the reciprocating slide may take place notwithstanding the fact that the coupling bolt 12 fits without play in the hole 2.

What I claim is:

In motion transmitting mechanisms, the combination of a driving lever, means for actuating the lever, a sliding piece on the driving lever, radially movable relatively to the pivoting point of the lever and having holes at graduated distances from said pivoting point, a rectilinearly guided reciprocating slide to be driven by said lever, coupling bolts carried by this slide, similarly arranged and corresponding in number to the holes of the aforesaid sliding piece, and means for throwing any one of the coupling bolts into its corresponding hole of the sliding piece of the driving lever, so as to allow of the transmission of motion of the lever to the slide at a corresponding length of the lever, substantially as and for the purpose described.

In witness whereof I have hereunto signed my name this 21st day of February 1910, in the presence of two subscribing witnesses.

ROBERT ZAHN.

Witnesses:
ROBERT H. NIER,
RICHARD B. WASHINGTON.